United States Patent
Kirsgalvis

[11] Patent Number: 6,116,429
[45] Date of Patent: Sep. 12, 2000

[54] FILTER HOUSING EXTENSION KIT

[76] Inventor: Richard D. Kirsgalvis, 1 Marine Dr. Unit 1-6, Michigan City, Ind. 46360

[21] Appl. No.: 09/338,689

[22] Filed: Jun. 23, 1999

[51] Int. Cl.[7] .................................................. B01D 29/27
[52] U.S. Cl. ........................ 210/356; 210/441; 210/450; 210/452; 210/455; 210/456; 210/474; 210/495
[58] Field of Search ................................ 210/356, 435, 210/437, 440, 441, 451, 452, 455, 456, 474, 477, 482, 485, 499, 315, 317, 445, 495

[56] References Cited

U.S. PATENT DOCUMENTS

| | | | |
|---|---|---|---|
| 3,681,899 | 8/1972 | Grote | 55/503 |
| 3,931,015 | 1/1976 | Jenkins | 210/232 |
| 4,073,622 | 2/1978 | Luppi | 23/258.5 |
| 4,172,798 | 10/1979 | Kronsbein | 210/446 |
| 4,259,188 | 3/1981 | Morgan | 210/451 |
| 4,399,033 | 8/1983 | Rosaen et al. | 210/236 |
| 4,775,469 | 10/1988 | Zimmerly | 210/237 |
| 4,863,598 | 9/1989 | Drori | 210/232 |
| 5,064,528 | 11/1991 | Hsu | 210/8.5 |
| 5,178,753 | 1/1993 | Trabold | 210/437 |
| 5,510,029 | 4/1996 | Benian | 210/333.01 |
| 5,565,097 | 10/1996 | Hayday | 210/167 |
| 5,810,999 | 9/1998 | Bachand et al. | 210/206 |
| 5,899,342 | 5/1999 | Livsey | 209/725 |

Primary Examiner—Matthew O. Savage
Attorney, Agent, or Firm—Orum & Roth

[57] ABSTRACT

An extension kit for adaptation to an existing filter housing provides a two-fold increase in filtering surface area, while inducing a vibration into a resultant filter housing structure which resultantly loosens entrapped impurities to extend the life and frequency between filter change-outs.

7 Claims, 1 Drawing Sheet

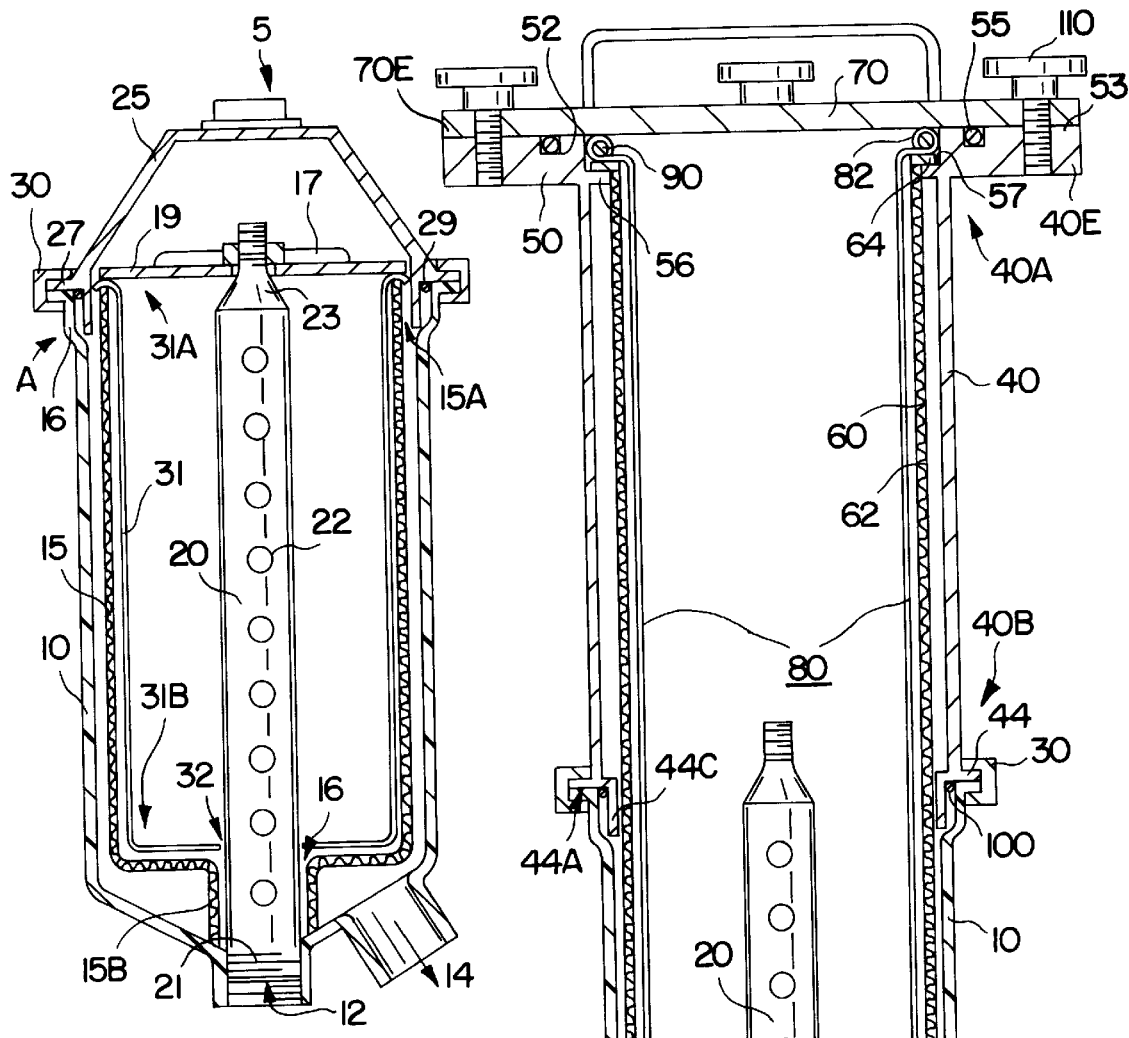
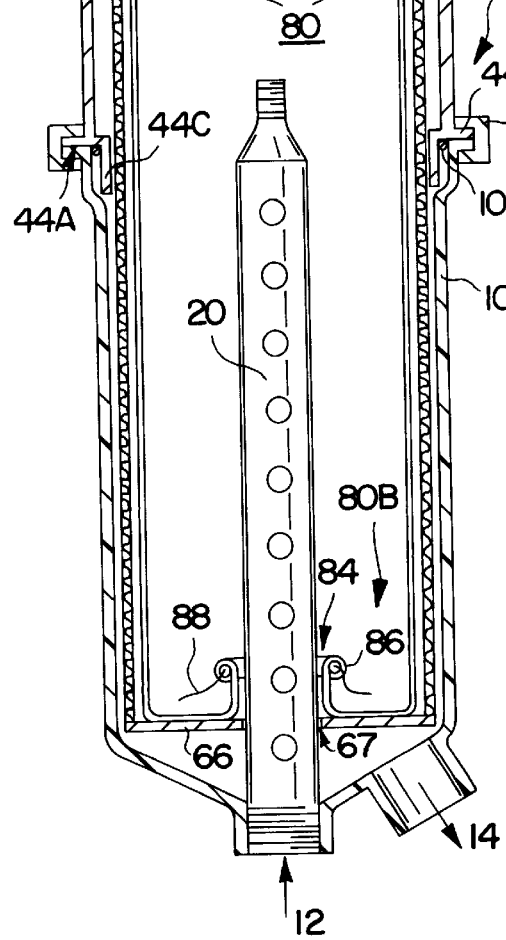
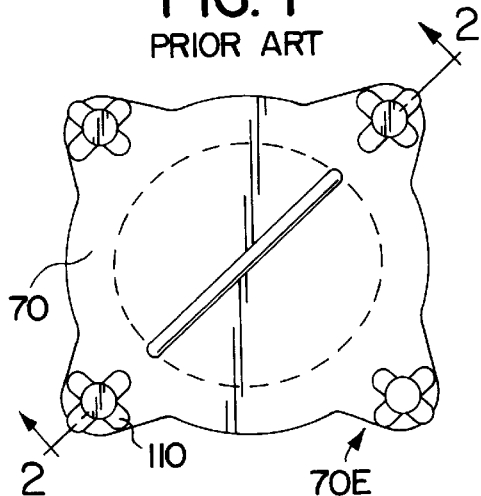
FIG. 1 PRIOR ART
FIG. 2
FIG. 3

FILTER HOUSING EXTENSION KIT

BACKGROUND OF THE INVENTION

1. Field of the Invention

The instant invention relates generally to a filter device for a dry cleaning fluid flow system in a dry cleaning machine.

More particular, this invention relates to a multiple-part fluid filter housing having first and second housing parts, and being arranged to contain a replaceable filter element.

2. Description of the Prior Art

Various equipment has been developed with respect to the dry cleaning industry to filter the cleaning fluids for repeated use. A well-known type of filter utilizes a disposable bag filter, wherein the filter medium is generally in the form of a woven flexible bag suspended within a fluid-impervious housing. The filter bag may be of the self-supporting type, or it may be enclosed within a sieve-like basket that provides mechanical strength against the pressure differential created by the fluid being forced through the bag.

Filter housings utilizing replaceable filter elements are known. However, they require improvement in many respects, particularly with regard to improving performance and longevity. This point is expressly true in the dry cleaning industry, where almost the entire industry has been using the same type of filter housing for the last several decades. This particular industry-accepted filter housing is about 15 inches tall and about 8 inches in diameter.

Advantages of disposable bag filters include their relatively low cost and their ability to handle large volumes of fluid. On the other hand, a reoccurring problem with bag-type filters involves the timely replacement of the bags wherein each time a bag requires changing, the entire fluid system must typically be removed from service. Furthermore, existing filter housings require tools to remove the ring clamps which retain the cover on the filter housing. Because of those drawbacks dirty filters are usually replaced later than expected. resulting with a shorter life expectancy of the dry cleaning fluid. Since the dry cleaning fluid is considered a hazardous waste product by the EPA, expensive and meticulous disposal requirements must be followed when replacing dirty dry cleaning fluid within the system. Thus, a need exists for an improved dry cleaning filter housing which does not require special tools to gain access to the filter bag, and which allow a longer period of time between filter replacements, thereby extending the longevity of the dry cleaning fluid.

Therefore, this invention provides a filter housing extension kit which is adaptable to existing filter housing units in order to physically double the surface area of the filter element; it is simple and compact in construction, and capable of being opened or closed rapidly to change the replaceable filter bag element without the need of tools, thereby minimizing down time of the entire fluid flow system. By physically doubling the surface area of the filter, the useful life of the filter can be extended three times that of the original filter, provided the flow rate remains the same. Advantageously, the larger surface area provides improved filtering of the dry cleaning fluid, while simultaneously extending the time period between filter changes.

SUMMARY OF THE INVENTION

According to the invention, the filter housing extension kit has a first housing part having a complementary mating surface that is connected to the top of the original filter housing and then secured by a screw-threaded ring clamp which is fastened about the outer face of both the first housing part and the original housing. Preferably, the first housing part also includes an axially compressible O-ring seal which is retained about the complementary mating surface. The O-ring prevents leakage between the original housing and the extension housing. The ring clamp which is used for connecting the two housing parts together is the same clamp from the original filter housing unit, formerly used for connecting the cover to the housing.

The remaining components of the filter housing extension kit in accordance with this invention include a second and physically taller strainer basket, a quick release cover or lid and a physically longer filter bag. The resultant housing is of simple and compact construction, is versatile in use and can be opened and closed easily and rapidly. Also, the resultant longer filter housing has the unexpected but particularly favorable result of promoting a subtle vibration into the resultant housing, thereby creating a subtle "shaking" of the contents entrapped in the filter bag, such that they are continuously loosened from the filter bag so as to gather at the bottom. This shaking movement enhances performance and further extends the filter life by a sort of self-cleaning. It is believed that because the internal fluid inlet distribution tube does not extend the entire extent of the resultant housing as it did in the past with the starting housing, the area above the tube facilitates uninterrupted travel of a shock wave which corresponds to the cyclic action of the pump, thereby creating the vibration.

DETAILED DESCRIPTION OF THE DRAWINGS

FIG. 1 is a cross-sectional view of a prior art filter device typical of the dry cleaning industry;

FIG. 2 is a cross-sectional view of the extension kit of the present invention shown adapted to an existing filter housing; and FIG. 3 is a t op view of the invention emphasizing the cover.

DETAILED DESCRIPTION OF THE PREFERRED EMBODIMENT

Prior to thoroughly under standing the working concepts of the present invention, an understanding of the prior art filtering device is necessary. Therefore, referring to FIG. 1, a prior art filter device is shown at 5 and is comprised of the housing 10, having a threaded inlet 12 at the bottom of the housing and an outlet 14, also at the bottom. The inlet distribution tube 20 has a threaded bottom end 21 that is received with in inlet 12, extending vertically to the open top of the housing. A plurality of equally spaced and equally sized apertures 22 extend transversely through the diameter of the tube so that the fluid to be cleaned is distributed throughout the entire housing in a simultaneous fashion. The tip of the distribution tube is closed and threaded for accepting a wing nut 17. Prior to engaging wing nut 17, a cylindrically-shaped, perforated filter b ask et 15 is first inserted within housing 10. The bottom of basket 15 is provided with an upstanding, annular base 15B which is pro vided with an opening 16 that is closely matched diametrically with that of inlet distribution pipe 20 so that bottom 15B can be slidingly fitted over tube 20 until fully received within housing, 10. The wing nut, when screwed downwardly, pushes bag hold-down plate 19 against a top surface of perforated filter basket 15 to hold filter bag 31 in place. The diameter of plate 19 is predetermined to tightly fit within a circumferentially enlarged side wall area A in housing 10. The filter bag 31 is woven from a polyethylene fiber, which is suitable to filter the liquid, preferably a dry cleaning solvent. The flexible filter bag, has a large open mouth 31A at its top end and a narrow bottom end 31B, with a small aperture 32, for receiving therethrough, inlet distribution tube 20. The bottom of filter bag 31 is downwardly guided along tube 20 until it touches the bottom of filter basket 15, while top 31A is draped over the top edge of basket 15.

A cover 25 is received over housing 10 such that overhang 27 of cover 25 mates with extension 16 of housing 10, and is sealed by squarely-configured ring gasket 29. The external ring clamp 30 known to those in the art is of the screw activated type, and is secured across the mating surfaces to sealably hold the cover in place once the filter is pressurized.

Operationally, a dirty solvent fluid enters housing 10 through inlet 12 and inlet tube 20 before flowing through filter bag 31. The pressure of the fluid causes the filter bag to be pressed against basket filter 15, which supports the filter during removal of entrapped impurities. The multitude of perforations in filter basket 15 allow the fluid to continuously exit the filter bag and eventually housing 10 through outlet 14. Upstream and downstream pressure gauges (not shown) can be used to indicate when a filter bag is fill and should be changed.

To effectuate such change, the flowing fluid system is shut down and the pressure bled-off at a convenient location. An operator must then use the appropriate tools to remove clamp 30 prior to removing cover 25. Plastic wing nut 17 is then unthreaded in order to remove plate 19 so as to expose filter bag element 31. During plate removal, an operator must exercise caution not to allow the top of bag 31 to fall back inside basket 15. Thereafter, filter bag 31 is completely removed from housing 10. However, during removal, an operator must pinch opening 32 to prevent entrapped impurities from falling out. After replacing the filter bag, precise alignment of the cover and housing elements 27 and 16 is required to prevent leakage despite the presence of ring seal 29. Once cover 25 is in place, ring clamp 30 is again externally installed about the cover and housing, and the unit is returned to service.

Turning attention now to FIG. 2, the present invention will now be described. Like components from the prior art filter housing assembly will be used to describe like components of the present invention if applicable. This figure illustrates that original housing 10 is retained, as is inlet tubing 20, as previously described.

A first component of the present invention is cylindrically-shaped casing 40 which is adapted to provide annular shelf 44 for resting engagement against housing extension 16. It is to be noted that unlike the prior art housing, shelf 44 provides an extended surface 44A to bridge extension 16, so that when a standard O-ring 100 is inserted therebetween, an improved fluid seal is established at that point of connection. Providing further stability to the connection is the fact that after the shelf 44 contacts extension 16, the casing bottom 40B projects downwardly into the interior of housing 10 to act as a stabilizing leg 44C. Thus, even though casing 44 is about the same vertical extent as the original housing 10, it is statically secure within housing 10 because of surface 44A and leg 44C contacting at two points along housing 10. To complete the joining of these two members, clamp 30 is preferably retained from the original filter housing assembly, and used for securely holding members 10 and 40 together, thereby forming what will be referred to hereinafter as the resultant housing. It should be particularly noted that inlet distribution tube 20 extends vertically to about the connection point between housing 10 and casing 40, which is believed to significantly affect operation of the present invention, as will be explained later herein.

Casing 40 has an open top end 40A that is delimited by annular collar 50. As seen, collar 50 includes an annular undercut so as to form a circumferential ledge 56, internal of casing 40. The ledge 56 includes top surface 57 for receiving in resting contact thereon, annular lip 64 of elongate filter basket 60. The lip 64 faces away from the interior of casing 40 and is diametrically slightly smaller than the diameter of the annular undercut. Collar 50 also includes top surface 53 which is provided with an annular channel therein for receiving O-ring 55. The O-ring 55 creates a fluid-tight seal between top surface 53 and cover 70, when the latter is fastened to casing 40.

Filter basket 60 is similar to filter basket 15 in that it contains a multitude of perforations; however, the bottom of basket 60 is formed as a solid planar plate 66 having a centrally disposed hole 67 therein. The diameter of hole 67 is close to that of inlet tube 20 and it is to be noted that plate 66 prevents fluid from entering the portion of filter bag 80 which rests on plate 66. This operational aspect will be explained shortly, since it facilitates removal of the filter bag without spilling any of the collected impurities.

The filter bag element 80 of the present invention provides twice the surface area of the prior art filter bag 31. Provided that the flow rates remain equal, it has been found that a doubling of the filtering surface area will extend the useful life of a filter by a factor of three.

FIG. 2 also illustrates that filter bag 80 has a bottom end 80B which is provided with a hole 84 for sliding inlet tube 20 therein. The bottom of filter bag 80 also preferably includes a hem 86 sewn into the bag for receiving a drawstring 88 therein. The drawstring serves to pull the bottom 80B closely against tube 20 after bag 80 is inserted into basket 60 and over tube 20. The top 80A of bag 80 includes a second hem 82 for receiving therein, a round metal ring 90 that is used for retaining filter bag 80 against annular lip 64 of basket 60. The ring 90 is frictionally fitted between cover 70 and lip 64 once cover 70 is secured.

As the FIGS. 2 and 3 show, cover 70 is expediently removed from casing 40 by manipulation of speed knobs 110 which are comprised of a handle or knob portion integrally connected to threaded posts. The ears 40E on casing 40 and 70E on cover 70 are each provided with complementary threaded throughbores for receiving the threaded posts. Thus, it can be appreciated that the present invention allows an operator to quickly remove cover 70 without any tools, thereby reducing the tool downtime of the fluid system to which the resultant filter assembly is connected.

Operationally, contaminated fluid enters inlet 12 and proceeds to fill the resultant housing such that a solid fluid head exists above the fluid inlet distribution pipe 20. Most of the particulate removal will occur within the filter bag area adjacent tube 20, although matter does become entrapped along the extent of filter bag 80, above inlet pipe 20. Unexpectantly, but advantageously, it is believed that the fluid head above inlet pipe 20 transmits and/or amplifies a shock wave created by the pumping action of the pump pushing the fluid through the fluid piping system. This vibration has been found to cause a subtle vibration within the resultant housing such that the life of the filter bag is improved because the entrapped particles are continuously being shaken from the filter bag, such that they fall to the filter bag bottom and rest on solid plate 66. It has been discovered that the time period before filter change-outs is extended due to this added vibration feature. Coupled with the provision of providing two-fold gain in surface area, the present invention offers an improvement to the life of the filter and time periods between change-outs.

When a filter change is required, the solid plate 66 has been found to leave an area of the filter bag which allows fluid drainage when bag 80 is pulled upwardly out of the housing 10 and casing 40. The drawstring 88 facilitates closing-off of the hole 84 in the bottom of bag 80 to thereby prevent the spillage of collected impurities.

Having described the invention, still further modification will become apparent to those skilled in the art to which it pertains without deviation from the spirit of the invention as defined by the scope of the appended claims.

I claim:

1. An extension attachment kit for a filter housing, said filter housing including a cylindrical housing delimited by an open, top end and a closed, bottom end, said bottom end including an inlet fluid distribution tube extending upwardly to said top end of said housing, said inlet distribution tube including a plurality of openings therein for introducing a fluid to be filtered into said housing, said extension attachment kit comprising:

an open casing defined by a vertical cylindrical side wall having an open top end and an open bottom end, said bottom end removably and sealably connected to said top end of said filter housing, said top end terminating with an annular collar thereabout, said collar having an inside surface and a top surface, said inside surface including an undercut therein for providing an inner circumferential shoulder;

a removable cover for sealably closing said open top end of said casing, said cover in resting contact against said top surface of said collar;

an elongate filter basket formed from a perforated cylinder having a first closed end and a second open end, said first closed end comprising a planar plate having a centrally disposed hole therein, said second open end delimited by an annular lip extending away from said cylinder, said filter basket slidably received within said casing and said filter housing wherein said inlet distribution tube projects though said central hole such that said planar plate is in close proximity to said bottom end of said housing and said annular lip rests on said inner circumferential shoulder of said collar;

an elongate, disposable filter bag inserted within said filter basket, a bottom of said filter bag having a centrally located opening such that said filter bag bottom is slid over said inlet fluid distribution tube, an open top of said filter bag in resting contact against said annular lip of said filter basket; and a means for holding said casing and said filter housing together at a point of connection, wherein said inlet distribution tube extends upwardly to about said connection point so as to provide an area above said inlet distribution tube which causes a continuous vibration in said filter housing and casing, thereby resulting with a continuous shaking of said filter bag so as to loosen impurities entrapped on said filter bag.

2. The filter housing extension kit of claim 1, wherein said top of said filter bag includes a metal ring sewn into said bag, said ring in resting contact on said annular lip of said filter basket.

3. The filter housing extension kit of claim 2, wherein said hole in said bottom of said filter bag is delimited by a drawstring sewn into said bag.

4. The filter housing extension kit of claim 1, wherein said connection point between said filter housing and said casing includes an O-ring to provide a fluid-tight seal.

5. The filter housing extension kit of claim 4, wherein said means for holding is a screw-driven clamp.

6. The filter housing extension kit of claim 1, wherein said top surface of said annular collar includes a groove therein and an O-ring inserted within said groove, said O-ring providing a sealed contact between said cover and said annular collar.

7. The filter housing extension kit of claim 5, wherein said cover is fastened to said casing without utilizing tools.

* * * * *